(12) United States Patent
Kunimoto et al.

(10) Patent No.: US 8,063,127 B2
(45) Date of Patent: Nov. 22, 2011

(54) ANTIHAZING AGENT FOR NONCRYSTALLINE CYCLOOLEFIN RESINS, RESIN COMPOSITIONS, AND OPTICAL ELEMENTS

(75) Inventors: Eiki Kunimoto, Shizuoka (JP); Hirotaka Miyazaki, Shizuoka (JP); Hajime Serizawa, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 81 days.

(21) Appl. No.: 12/096,158

(22) PCT Filed: Oct. 30, 2006

(86) PCT No.: PCT/JP2006/321670
§ 371 (c)(1),
(2), (4) Date: Jul. 9, 2008

(87) PCT Pub. No.: WO2007/066455
PCT Pub. Date: Jun. 14, 2007

(65) Prior Publication Data
US 2009/0018236 A1    Jan. 15, 2009

(30) Foreign Application Priority Data
Dec. 6, 2005  (JP) ................................. 2005-352202

(51) Int. Cl.
C09D 11/02 (2006.01)
C08L 23/00 (2006.01)
C08L 25/00 (2006.01)
C08L 93/00 (2006.01)
C09J 7/02 (2006.01)

(52) U.S. Cl. ........................................ 524/274; 524/270

(58) Field of Classification Search .......... 523/174–175; 524/270, 274
See application file for complete search history.

(56) References Cited

U.S. PATENT DOCUMENTS

| | | | |
|---|---|---|---|
| 4,127,546 A * | 11/1978 | Lundberg et al. ............. | 524/274 |
| 5,576,392 A | 11/1996 | Yamamoto et al. | |
| 5,856,386 A * | 1/1999 | Sakai et al. ................... | 524/271 |
| 5,998,576 A * | 12/1999 | Sadamitsu et al. ........... | 530/210 |
| 6,187,422 B1 * | 2/2001 | Murschall et al. ........... | 428/220 |
| 6,387,317 B1 | 5/2002 | Roberts | |
| 6,806,315 B2 * | 10/2004 | Shin et al. ..................... | 525/230 |
| 2003/0027926 A1 * | 2/2003 | Miyamoto et al. ............ | 525/70 |
| 2003/0055179 A1 | 3/2003 | Ota et al. | |
| 2003/0114623 A1 * | 6/2003 | Mitani et al. .................. | 526/352 |
| 2005/0014898 A1 * | 1/2005 | Kanai ............................ | 525/163 |
| 2006/0047096 A1 * | 3/2006 | Takahashi et al. ............ | 526/352 |

FOREIGN PATENT DOCUMENTS

| | | |
|---|---|---|
| EP | 0703275 A | 3/1996 |
| GB | 1231861 | 5/1971 |
| JP | 09-183872 A | 7/1997 |
| JP | H9-176396 A | 7/1997 |
| JP | H9-176398 A | 7/1997 |
| JP | H10-279739 A * | 10/1998 |
| JP | 11315221 * | 11/1999 |
| JP | 2000-198892 A | 7/2000 |
| JP | 2001-26682 A | 1/2001 |
| JP | 2001-26718 A | 1/2001 |
| JP | 2001-221915 A * | 8/2001 |
| JP | 2001-264971 A * | 9/2001 |
| KR | 1999-81921 | 11/1999 |
| WO | WO 98/24848 | 6/1998 |
| WO | WO 01/53369 | 7/2001 |

OTHER PUBLICATIONS

Machine Translation of Document N above.*
Machine Translation of Documnet O above.*
Machine Translation of Document P above.*
Odian, George. Principles of Polymerization. Hoboken, New Jersey: John Wiley & Sons, Inc., 2004.*
Office Action issued to KR patent application No. 10-2008-7015299 mailed Jul. 31, 2009.
Written Opinion issued to SG Application No. 200804234-3, mailed May 11, 2008.
Extended European Search Report issued to European Application No. 06812179.7, mailed Apr. 1, 2009.
Notice of Reasons for Rejection issued to CN Application No. 200680045430.9, mailed Feb. 12, 2010.

* cited by examiner

*Primary Examiner* — Katarzyna Wyrozebski Lee
*Assistant Examiner* — Anthony H Sheh
(74) *Attorney, Agent, or Firm* — Carter, DeLuca, Farrell & Schmidt, LLP

(57) ABSTRACT

An antihazing agent for noncrystalline cycloolefin resins which can inhibit the hazing of the resins due to fine cracking caused by environmental change, particularly, environmental change from high temperature and humidity atmosphere to ordinary temperature and humidity atmosphere without losing the characteristics inherent in the resins to keep the transparency of the resins and inhibit the light transmittance thereof from lowering; noncrystalline cycloolefin resin compositions containing the agent; and optical elements made from the compositions. A compound component containing a metal rosinate as the main component is used as the antihazing agent for noncrystalline cycloolefin resins. It is particularly preferable that the antihazing agent further contain one or more members selected from the group consisting of alkali metal salts, alkaline earth metal salts, and Group 12 metal salts.

14 Claims, No Drawings

ANTIHAZING AGENT FOR NONCRYSTALLINE CYCLOOLEFIN RESINS, RESIN COMPOSITIONS, AND OPTICAL ELEMENTS

TECHNICAL FIELD

The present invention relates to an antihazing agent for noncrystalline cycloolefin resins, noncrystalline cycloolefin resin compositions including the antihazing agent, and optical elements obtainable from the resin compositions. More specifically, the present invention relates to an antihazing agent for noncrystalline cycloolefin resins, the antihazing agent being capable of maintaining the transparency of a molded article constituted with resin compositions having noncrystalline cycloolefin resins as a main component and preventing microcrack generation in the molded article, especially even after being exposed to high temperature and humidity conditions, noncrystalline cycloolefin resin compositions including the antihazing agent, and optical elements obtainable from the resin compositions.

BACKGROUND ART

Cycloolefin resins are resins having a cyclic olefin skeleton in their backbone and having properties including high transparency, low birefringence, high heat deformation temperature, light weight, dimensional stability, low water-absorbency, hydrolysis resistance, chemical resistance, low-dielectric constant, low-dielectric loss, freedom from materials which present environmental problems. Consequently, cycloolefin resins are used in various fields which require the aforementioned properties.

Among them, in view of properties such as high heat resistance, high transparency, and low birefringence, cycloolefin resins are used as materials for transparent molding-processed articles in optical devices such as lenses, light guide plates, and diffraction gratings, and industrial materials used in the fields of construction, lighting, and the like.

When cycloolefin resins are used for optical elements, whether or not the resin elements can endure the usage environment becomes the most important factor. That is, it is required that optical properties do not deteriorate by resin deterioration due to the usage environment. Various conditions of the usage environment are envisioned depending on the article in question. However, especially tough environment conditions are assumed to be about 95° C. in temperature and about 95 RH in humidity. Therefore, it is required that the optical properties can be maintained without deterioration of the resins even when the resins are exposed to such environments.

However, a molded article made of cycloolefin resins becomes cloudy depending on its usage environment, and the transparency and light transmittance, which are properties of the resins, deteriorate. This fact adversely affects the usage of the resins in fields which requires transparency, such as optics applications. Particularly, environmental changes going to a normal humidity and normal temperature atmosphere after exposure to a high humidity and high temperature atmosphere posed the problem of clouding due to microcrack generation which occurs in a molded article made of cycloolefin resins, which intrinsically have low water-absorbency, when water vapor trapped in the article under the high temperature and high humidity atmosphere condenses inside the article without exiting therefrom under normal temperature and normal humidity.

For the purpose of preventing such a deterioration in the transparency of cycloolefin resins, resin compositions including cycloolefin resins together with an amine compound or amide compound, which have hydrophilic groups and hydrophobic groups in the same molecule, at a specific ratio have been proposed (Patent Document 1).

Patent Document 1: Japanese Unexamined Patent Publication No. H09-176396

DISCLOSURE OF THE INVENTION

Problems to be Solved by the Invention

However, a level where clouding is sufficiently prevented cannot be achieved by the amine compound or amide compound having hydrophilic groups and hydrophobic groups in the same molecule which is described in Patent Document 1. Therefore, further improvement has been required.

The present invention has been made in view of the above problems, and it is an object of the present invention to provide antihazing agents for noncrystalline cycloolefin resins capable of preventing clouding caused by microcrack generation due to environmental changes, especially environmental changes resulting from going from exposure to a high temperature and high humidity atmosphere to a normal temperature and normal humidity, maintaining the transparency, and preventing lowering of the light transmittance, and noncrystalline cycloolefin resin compositions including the antihazing agents, and optical elements obtainable from the resin compositions.

Means for Solving the Problems

In order to solve the above problems, the present inventors have conducted extensive studies on antihazing agents for noncrystalline cycloolefin resins which can reach a level where clouding is sufficiently prevented. As a result of these studies, the present inventors have found that the above problems can be solved by the use of compounds having a metal rosinate as a main component, and have completed the present invention. More specifically, the present invention provides the following.

(1) An antihazing agent for noncrystalline cycloolefin resin, comprising as a main component a metal rosinate, and wherein said antihazing agent is included in a resin composition which includes as a main component a noncrystalline cycloolefin resin including a cyclic olefin component as a copolymer component, and maintains transparency of a molded article obtained from said resin composition.

The antihazing agent for the noncrystalline cycloolefin resin according to (1) can prevent clouding caused by environmental changes by including a metal rosinate as its main component, while maintaining the properties inherent in a noncrystalline cycloolefin resin. As a result, the transparency of the molded article can be maintained.

"Prevention of clouding" used in the present invention means not only prevention of the deterioration of the transparency which is inherent in a noncrystalline cycloolefin resin caused by a molding process, but also prevention of the generation of "clouding" caused by deterioration of transparency due to clouding inside the molded article generated by environmental changes to which the molded article is exposed after the molding process.

Particularly, in a molded article made of resin compositions which include as a main component a noncrystalline cycloolefin resin including a cyclic olefin component as a copolymer component, clouding of the molded article due to environmental change to normal temperature and normal humidity atmosphere after exposure to a high temperature and high humidity atmosphere is generated in a molded article made of cycloolefin resins which intrinsically has low water-absorbency when water vapor trapped in the article being exposed to the high temperature and high humidity atmosphere condenses inside the article without exiting under a normal temperature and normal humidity atmosphere. According to the antihazing agent for the noncrystalline cycloolefin resin of (1), such clouding can be prevented and the transparency or light transmittance can be maintained.

Meanwhile, "noncrystalline" as used in the present invention means, even in a polymer solidified from a melt state by slow cooling, a case where diffraction derived from a crystal cannot be observed by X-ray diffraction and only an amorphous halo can be observed, or a case where a first transition peak derived from a crystal is not observed other than a glass transition point.

In the molded article made of noncrystalline cycloolefin resin, a cause of clouding generated by environmental change from exposure to high temperature and high humidity atmosphere, to ordinary temperature and ordinary humidity atmosphere following thereafter, is that water vapor trapped in the article under the high temperature and high humidity atmosphere condenses inside the article without exiting therefrom under the normal temperature and normal humidity atmosphere, thereby to generate microcrack.

In order to prevent clouding, the antihazing agent is required to have a function of preventing condensation of water molecules trapped in the molded article. To achieve this, it is required to include both hydrophilic groups and hydrophobic groups in the same molecule. The hydrophilic groups have a function to increase the affinity of the noncrystalline cycloolefin resin to water. The hydrophobic groups have a good compatibility with the noncrystalline cycloolefin resin so that the transparency inherent in the noncrystalline cycloolefin resin is not impaired. As a result of keen examination, the present inventors have found that the use of metal rosinate as the antihazing agent is effective in preventing clouding.

(2) The antihazing agent for noncrystalline cycloolefin resin according to (1), wherein the metal salt includes one or more members selected from the group consisting of alkali metal salts, alkaline earth metal salts, and Group 12 metal salts.

The antihazing agent for the noncrystalline cycloolefin resin according to (2) uses one or more members selected from the group consisting of an alkali metal salt, an alkaline earth metal salt, and a Group 12 metal salt as metal salts. The above-described metal salts have a favorable effect on inhibiting the hazing.

(3) The antihazing agent for the noncrystalline cycloolefin resin according to (2), wherein the alkaline metal salts contain at least one of sodium salts or potassium salts.

The alkaline metal salt according to (3) contains at least one of a sodium salt or a potassium salt. Among the alkaline metal salts, sodium and potassium are metal species having a favorable effect on inhibiting the hazing.

(4) The antihazing agent for the noncrystalline cycloolefin resin according to (2), wherein the alkaline earth metal salt contains at least one of a calcium salts or a magnesium salt.

The alkaline earth metal salt according to (4) contains at lease one of a calcium salt or a magnesium salt. Among the alkaline earth metal salts, calcium and magnesium are metal species having a favorable effect on inhibiting the hazing.

(5) The antihazing agent for a noncrystalline cycloolefin resin according to (2), wherein the Group 12 metal salt contains a zinc salt.

The Group 12 metal salts according to (5) contains a zinc salt. Among the Group 12 metal salts, zinc is a metal species having a favorable effect on inhibiting the hazing.

(6) The antihazing agent for the noncrystalline cycloolefin resin according to any one of (1)-(5), wherein the rosinates are one or more members selected from the group consisting of compounds represented by general formulae (I), (II), (III), and (IV).

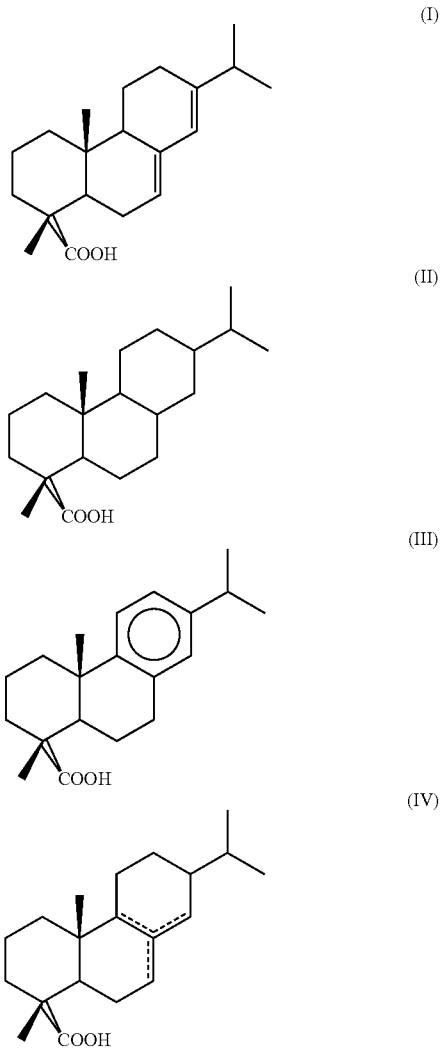

The antihazing agent for the noncrystalline cycloolefin resin according to (6) contains one or more of an abietic acid represented by the general formula (I), a hydrogenated product of abietic acid represented by the general formula (II), a dehydroabietic acid represented by the general formula (III), and a dihydroabietic acid represented by the general formula (IV).

The antihazing agent for the noncrystalline cycloolefin resin according to (6) can prevent oxidation degradation and provide stability by adding hydrogen to a conjugated double bond of abietic acid represented by the general formula (I) (a hydrogenated product of abietic acid represented by the general formula (II)). In addition, by disproportionating bimolecular abietic acid having conjugated double bonds and changing it into one an aromatic molecule (dehydroabietic acid represented by the general formula (III)) and another molecule having a single double bond (dihydroabietic acid represented by the general formula (IV)), the stability can be improved compared to the abietic acid represented by the general formula (I).

(7) A noncrystalline cycloolefin resin composition including a noncrystalline polyolefin resin which contains a cycloolefin component as a copolymer component, and the antihazing agent for a noncrystalline cycloolefin resin according to any one of (1)-(6).

The noncrystalline cycloolefin resin composition according to (7) can provide the effect described in the above (1), because it contains the antihazing agent for a noncrystalline cycloolefin resin having a metal rosinate as a main component. Therefore, clouding of a molded article made of resin composition caused by environmental change can be prevented while maintaining the properties inherent in the noncrystalline cycloolefin resin. As a result, the transparency of the molded article can be maintained.

(8) The noncrystalline cycloolefin resin composition according to (7), wherein the content of the antihazing agent for the noncrystalline cycloolefin resin is equal to or more than 0.1 parts by mass and equal to or less than 5 parts by mass on the basis of 100 parts by mass of the noncrystalline polyolefin resin.

The noncrystalline cycloolefin resin composition according to (8) can sufficiently provide the effect of the present invention described in the above (1), by containing the antihazing agent for a noncrystalline cycloolefin resin in an amount of equal to or more than 0.1 parts by mass and equal to or less than 5 parts by mass. When the content is less than 0.1 parts by mass, sufficient anti-clouding effect cannot be obtained, while when the content is more than 5 parts by mass, the antihazing agent does not melt into the resin, so that phase separation occurs and the resin composition becomes clouded, which are not preferable.

(9) The noncrystalline cycloolefin resin composition according to (7) or (8), wherein the noncrystalline polyolefin resin is a copolymer including:

(A) an α-olefin component having 2 to 20 carbons; and (B) a cycloolefin component represented by the following general formula (V)

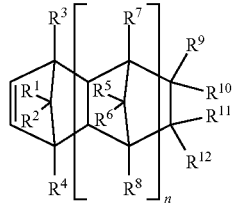

(V)

(wherein $R^1$-$R^{12}$ may independently be the same or different, and are each selected from group consisting of hydrogen atom, halogen atom, and hydrocarbon radical, $R^9$ and $R^{10}$, $R^{11}$ and $R^{12}$ may be combined to form a divalent hydrocarbon radical, $R^9$ or $R^{10}$, and $R^{11}$ or $R^{12}$ may form a ring by joining each other.

Also, n represents 0 or a positive integer, and when n is two or more, $R^5$-$R^8$ independently may be the same or different, for each repeating unit).

The noncrystalline polyolefin resin used in the noncrystalline cycloolefin resin composition according to (9) is a copolymer of an α-olefin component having 2 to 20 carbons and a specific cycloolefin component. The properties of polyolefin resins can be provided by the presence of an α-olefin component. On the other hand, the property of noncrystalline resins can be provided by a cycloolefin component. Therefore, in the noncrystalline cycloolefin resin composition according to (9), the features of polyolefin resins and noncrystalline resins can be integrated, so that various functions required for transparent materials can be provided.

(10) The noncrystalline cycloolefin resin composition according to any one of (7) to (9), wherein the composition is a molded article and light transmittance measured at a wavelength of 500-750 nm with a 2 mm light path length is 90% or more.

Generally, in optical elements, transparency is an important required property. 90% or more light transmittance measured at a wavelength of 500-750 nm sufficiently satisfies the transparency required for the performance of optical elements. Thus, the noncrystalline cycloolefin resin composition according to (10) has an initial transparency required for optical elements, and can prevent clouding due to subsequent environmental changes, and maintain the transparency of the molded article.

(11) The noncrystalline cycloolefin resin composition according to any one of (7) to (10), wherein the composition is a molded article and light transmittance measured at a wavelength of 400-750 nm with a 2 mm light path length is 80% or more.

The molded article made of the noncrystalline cycloolefin resin composition according to (11) has a light transmittance of 80% or more at a wavelength of 400-750 nm, therefore, it has sufficient transparency throughout the optical region. Therefore, the noncrystalline cycloolefin resin composition according to (11) can realize the effect described in the above (10) to a higher degree.

(12) An optical material including the noncrystalline cycloolefin resin composition according to any one of (7) to (11).

The noncrystalline cycloolefin resin composition according to the present invention contains an antihazing agent for a noncrystalline cycloolefin resin having a metal rosinate as a main component. Thus, it can prevent clouding caused by environmental changes of a molded article made of resin compositions while maintaining the properties inherent in noncrystalline cycloolefin resins. As a result, the transparency of the molded article can be maintained. Therefore, the noncrystalline cycloolefin resin composition according to the present invention can be used for optical materials which are capable of maintaining the transparency while satisfying various required properties.

(13) An optical element obtained by molding the noncrystalline cycloolefin resin composition according to any one of (7) to (11).

In applications such as optical elements, it is an important requirement to maintain their transparency. The noncrystalline cycloolefin resin composition of the present invention can prevent clouding caused by environmental changes, so that the transparency of a molded article can be maintained. Therefore, the composition can be preferably used as a material of molded articles which will be used as optical elements.

(14) The optical element according to (13), wherein the optical element is any one of a lens, light guide plate, or diffraction grating.

Lenses, light guide plates, and diffraction gratings are optical elements which especially require high heat resistance, high transparency, and low birefringence. The noncrystalline cycloolefin resin composition of the present invention can satisfy these required properties to a high degree, and, at the same time, can prevent clouding caused by environmental changes. As a result, the transparency of the molded article can be maintained.

Effects of the Invention

The antihazing agent for a noncrystalline cycloolefin resin according to the present invention can prevent clouding caused by environmental changes by including a metal rosinate as the main component thereof while maintaining the properties inherent in a noncrystalline cycloolefin resin. As a result, the transparency of the molded article can be maintained.

Particularly, it is possible to prevent clouding generated by environmental changes to a normal temperature and humidity atmosphere after exposure to a high temperature and humidity atmosphere of a molded article which is made of a resin composition which includes as a main component a noncrystalline cycloolefin resin including a cyclic olefin component as a copolymer component, while maintaining the transparency and light transmittance of the molded article.

PREFERRED MODE FOR CARRYING OUT THE INVENTION

Hereinafter, embodiments of the present invention will be explained.

Antihazing Agents for Noncrystalline Cycloolefin Resins

The antihazing agents for noncrystalline cycloolefin resins of the present invention are compounds having a metal rosinate as a main component.

Here, rosin is a residue obtained by turpentine being removed from resin of pine, that is common rosin, by hydrodistillation, and is a translucent pale yellow solid. About 90% of rosin is resin acid such as abietic acid (Dictionary of Physics and Chemistry (4th edition) page 1410). Rosinate means the aforementioned resin acid.

Moreover, abietic acid is a carboxylic acid which is a type of tricyclic diterpene having a structure represented by the general formula (I) described below, and is also known as sylvic acid. Abietic acid can be obtained by subjecting common rosin to alcohol percolation, superheating hydrodistillation, or reduced-pressure distillation and is a yellow or resinous powder (Dictionary of Physics and Chemistry (4th edition) page 26).

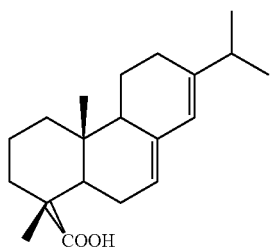

(I)

The rosinate used in the present invention is not limited to the compound represented by the above general formula (I), and may be a hydrogenated product of abietic acid represented by the general formula (II), dehydroabietic acid represented by the general formula (III), and dihydroabietic acid represented by the general formula (IV).

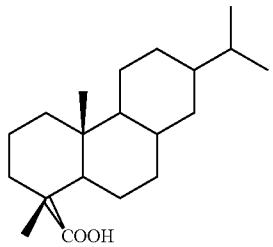

(II)

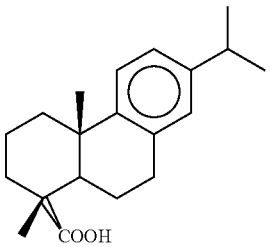

(III)

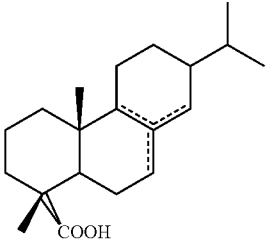

(IV)

Further, the rosinate used in the present invention may be one kind or a mixture of two or more kinds selected from the group consisting of the above general formulae (I), (II), (III), or (IV).

The metal which forms a salt with the rosinate is not especially limited. In particular, it is preferably one or more kinds of metal selected from the group consisting of alkali metals, alkaline earth metals, and Group 12 metals.

Alkali metals include lithium, sodium, and potassium. Among them, sodium and potassium are preferable. In addition, alkaline earth metals include magnesium, calcium, and strontium. Among them, magnesium and calcium are preferable. Group 12 metals include zinc and cadmium. Among them, zinc is preferable. These can be used solely or in a mixture of two or more kinds thereof.

The metal rosinate used as a main component of the antihazing agents for noncrystalline cycloolefin resins of the present invention may be a full salt, a partial salt, or a mixture thereof. Here, "partial salt" is a reaction product between rosinate and metal, and includes both the case of a mixture of metal rosinate and unreacted rosinate and the case of only metal rosinate not including unreacted rosinate.

When the rosinate is a partial salt, the equivalent amount of carboxyl group with respect to the equivalent amount of the metal is not especially limited, and varies depending on the kind of metal to be used. However, it is preferable that the equivalent amount of respective metals/equivalent amount of carboxyl group (%) is within a range of 10%-70%, more preferably 15%-60%.

For example, when calcium is used as an alkaline earth metal, the equivalent amount of rosinate partial calcium salt/equivalent amount of carboxyl group (%) is 47.5%. When magnesium is used as an alkaline earth metal, it is preferable that the equivalent amount of rosinate partial magnesium salt/equivalent amount of carboxyl group (%) is about 20%.

Noncrystalline Cycloolefin Resin Composition

Hereinafter, the noncrystalline cycloolefin resin composition of the present invention will be described. The noncrystalline cycloolefin resin composition of the present invention is a composition having, as an essential component, the noncrystalline cycloolefin resin containing a cycloolefin component as a copolymer component and the antihazing agents for noncrystalline cycloolefin resins of the present invention.

[Noncrystalline Cycloolefin Resin Containing a Cycloolefin Component as a Copolymer Component]

The noncrystalline cycloolefin resin containing a cycloolefin component used in the present invention as a copolymer component is not especially limited as long as it is a noncrystalline polyolefin resin containing a cycloolefin component in its backbone. For example, (a1) an addition polymer of cycloolefin or a hydrogenated product thereof, (a2) an addition copolymer of cycloolefin and α-olefin or hydrogenated product thereof, (a3) ring-opening (co)polymer of cycloolefin or a hydrogenated product thereof can be included.

Moreover, the noncrystalline cycloolefin resin containing a cycloolefin component used in the present invention as a copolymer component includes, (a4) resins of the above (a1) to (a3) being grafted and/or copolymerized unsaturated compound having polar groups.

A polar group can include, for example, carboxyl groups, acid anhydride groups, epoxy groups, amid groups, ester groups, and hydroxyl groups. An unsaturated compound having polar groups can include (meta)acrylic acids, maleic acids, maleic anhydride, taconic acid anhydride, glycidyl (meth)acrylate, alkyl(meta)acrylate (1-10 carbons) ester, maleic alkyl (1-10 carbons) ester, (meth)acrylamide, (meta) acrylic acid-2-hydroxyethyl.

The present invention can use one kind or mixture of two or more kinds of the noncrystalline cycloolefin resin containing the above cycloolefin component as a copolymer component (a1)-(a4). In the present invention, the (a2) addition copolymer of cycloolefin and α-olefin or hydrogenated product thereof can be favorably used.

Among them, the noncrystalline cycloolefin resins containing a cycloolefin component having a low impact value as a copolymer component are more likely to become clouded when being exposed to a high temperature and humidity environment followed by returning to a normal temperature and humidity environment. Thus, in the present invention, when the noncrystalline cycloolefin resin containing a cycloolefin component having a low impact value as a copolymer component, an especially remarkable effect can be obtained.

Also, as the noncrystalline cycloolefin resin containing a cycloolefin component which is used in the present invention as a copolymer component, commercially available resins can be used. The commercially available noncrystalline cycloolefin resins can include, for example, TOPAS (registered trademark) (manufactured by TOPAS Advanced Polymer), Apel (registered trademark, manufactured by Mitsui Chemical Co.), ZEONEX (registered trademark, manufactured by ZEON Corp.), ZEONOR (registered trademark, manufactured by ZEON Corp.), ARTON (registered trademark, manufactured by JSR Corp.).

Also, as the noncrystalline cycloolefin resin containing a cycloolefin component which is used in the present invention as a copolymer component, a copolymer specifically having the following structural unit can be used.

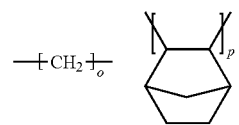

[wherein o and p are repeating units.]

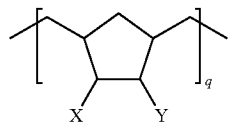

[wherein q is a repeating unit, X, Y are each independently a hydrocarbon radical containing 1 to 10 carbons.]

The (a2) addition copolymer of cycloolefin and α-olefin favorably used in the composition of the present invention is not especially limited. As especially preferable example includes copolymers including (A) α-olefin components having 2-20 carbons and (B) cycloolefin components represented by the following general formula (V)

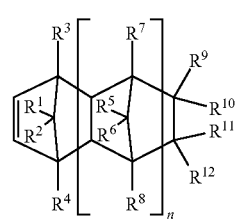

[wherein
$R^1$-$R^{12}$ may independently be the same or different, and are each selected from the group consisting of hydrogen atom, halogen atom, and hydrocarbon radical, $R^9$ and $R^{10}$, $R^{11}$ and $R^{12}$ may be combined to form a divalent hydrocarbon radical, $R^9$ or $R^{10}$, and $R^{11}$ or $R^{12}$ may form a ring by joining each other.

Also, n represents 0 or a positive integer, and when n is two or more, $R^5$-$R^8$ may each be the same or different, for each repeating unit.]

(A) α-olefin Component Having 2-20 Carbons

The α-olefin component having 2-20 carbons which serves as a copolymer component of the addition polymer which is formed by copolymerization of the cycloolefin component favorably used in the present invention and other copolymer components such as ethylene, is not especially limited. For example, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene can be included. One kind of these α-olefin components can be used, or two or more kinds thereof can be used simultaneously. Among them, use of only ethylene is most preferable.

(B) Cycloolefin Component Represented by the General Formula (V)

The cycloolefin component represented by the general formula (V), which serves as a copolymer component of the addition polymer which is formed by copolymerization of the cycloolefin component favorably used in the present invention and other copolymer components such as ethylene, will be described.

$R^1$-$R^{12}$ in the general formula (V) may each be the same or different, and are each selected from group consisting of hydrogen atom, halogen atom, and hydrocarbon radical.

Concrete examples of $R^1$-$R^8$ can include, for example, hydrogen atoms; halogen atoms such as fluorine, chlorine, bromine; low alkyl groups such as methyl groups, ethyl groups, propyl groups, butyl groups. These may be entirely different, partially different, or entirely the same.

Concrete example of $R^9$-$R^{12}$ can include, for example, hydrogen atoms; halogen atoms such as fluorine, chlorine, bromine; alkyl groups such as methyl groups, ethyl groups, propyl groups, isopropyl groups, butyl groups, isobutyl groups, hexyl group, stearyl groups; cycloalkyl groups such as cyclohexyl groups; substituted or unsubstituted aromatic hydrocarbon radicals such as phenyl groups, tolyl groups, ethylphenyl groups, isopropylphenyl groups, naphthyl groups, anthryl groups; aralkyl groups in which benzyl groups, phenethyl groups, and other alkyl group are substituted for aryl groups. These may be entirely different, partially different, or entirely the same.

Furthermore, as a concrete example of the case in which $R^9$ and $R^{10}$, or $R^{11}$ and $R^{12}$ are combined to form a divalent hydrocarbon radical, for example, alkylidene groups such as ethylidene groups, propylidene groups, and isopropylidene groups can be mentioned.

When $R^9$ or $R^{10}$, and $R^{11}$ or $R^{12}$ form a ring by joining each other, the resultant ring may be monocyclic or polycyclic, may be polycyclic with bridges, may be a ring having double bonds, or may be a ring constituted with a combination of these rings. Also, these rings may include substituent groups such as methyl groups.

A concrete example of the cycloolefin component represented by the general formula (V) is bicyclic cycloolefin, such as bicyclo[2.2.1]hept-2-ene (common name: norbornene), 5-methyl-bicyclo[2.2.1]hept-2-ene, 5,5-dimethyl-bicyclo[2.2.1]hept-2-ene, 5-etyl-bicyclo[2.2.1]hept-2-ene, 5-butyl-bicyclo[2.2.1]hept-2-ene, 5-ethylidene-bicyclo [2.2.1]hept-2-ene, 5-hexyl-bicyclo[2.2.1]hept-2-ene, 5-octyl-bicyclo[2.2.1]hept-2-ene, 5-octadecyl-bicyclo [2.2.1]hept-2-ene, 5-methylidene-bicyclo[2.2.1]hept-2-ene, 5-vinyl-bicyclo[2.2.1]hept-2-ene, 5-propenyl-bicyclo [2.2.1]hept-2-ene;

tricyclo[4.3.0.1$^{2,5}$]deca-3,7-diene (common name: dicyclopentadiene), tricyclo[4.3.0.1$^{2,5}$]deca-3-ene; tricyclo[4.4.0.1$^{2,5}$]undeca-3-ene which is tricyclo[4.4.0.1$^{2,5}$]undeca-3,7-diene or tricyclo[4.4.0.1$^{2,5}$]undeca-3,8-diene or a partial hydrogenated product thereof (or adduct of cyclopentadiene and cyclohexene); tricyclic cycloolefin, such as 5-cyclopentyl-bicyclo [2.2.1]hept-2-ene, 5-cyclohexyl-bicyclo[2.2.1]hept-2-ene, 5-cyclohexenyl-bicyclo[2.2.1]hept-2-ene, 5-phenyl-bicyclo [2.2.1]hept-2-ene;

tetracyclic cycloolefin, such as tetracyclo[4.4.0.1$^{2,5}$.1$^{7,10}$]dodec-3-ene (also simply referred to tetracyclododecen), 8-methyltetracyclo[4.4.0.1$^{2,5}$.1$^{7,10}$]dodec-3-ene, 8-ethyltetracyclo[4.4.0.1$^{2,5}$.1$^{7,10}$]dodec-3-ene, 8-methylidene tetracyclo[4.4.0.1$^{2,5}$.1$^{7,10}$]dodec-3-ene, 8-ethylidenetetracyclo[4.4.0.1$^{2,5}$.1$^{7,10}$]dodec-3-ene, 8-vinyltetracyclo[4.4.0.1$^{2,5}$.1$^{7,10}$]dodec-3-ene, 8-propenyl-tetracyclo[4.4.0.1$^{2,5}$.1$^{7,10}$]dodec-3-ene;

8-cyclopentyl-tetracyclo[4.4.0.1$^{2,5}$.1$^{7,10}$]dodec-3-ene, 8-cyclohexyl-tetracyclo[4.4.0.1$^{2,5}$.1$^{7,10}$]dodec-3-ene, 8-cyclohexenyl-tetracyclo[4.4.0.1$^{2,5}$.1$^{7,10}$]dodec-3-ene, 8-phenyl-cyclopentyl-tetracyclo [4.4.0.1$^{2,5}$.1$^{7,10}$]dodec-3-ene; tetracyclo[7.4.1$^{3,6}$.0$^{1,9}$.0$^{2,7}$]tetradeca-4,9,11,13-tetraen (also referred to as 1,4-methano-1,4,4a,9a-tetrahydroflorene), tetracyclo[8.4.1$^{4,7}$.0$^{1,10}$.0$^{3,8}$]pentadeca-5,10,12,14-tetraen (also referred to as 1,4-methano-1,4,4a,5,10,10a-hexahydroanthracene); pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene; heptacyclo[8.7.0.1$^{2,9}$.1$^{4,7}$.1$^{11,17}$.0$^{3,8}$.0$^{12,16}$]-5-eicocene, heptacyclo[8.7.0.1$^{2,9}$.0$^{3,8}$.1$^{4,7}$.0$^{12,17}$.1$^{13,16}$]-14-eicocene; polycyclic cycloolefin such as tetramer of cyclopentadiene.

One kind of or combinations of two or more kinds of these cycloolefin components may be used. Among them, use of only bicyclo[2.2.1]hept-2-ene (common name: norbornene) is preferable.

The method for polymerizing (A) an α-olefin component having 2 to 20 carbons and (B) a cycloolefin component represented by the following general formula (V), and the method for hydrogenating the resultant polymer are not especially limited, and can be carried out according to publicly known methods. Both random copolymerization and block copolymerization are acceptable, however, random copolymerization is preferable.

Also, the polymerization catalyst to be used is not especially limited, and copolymers can be obtained by using conventional well known catalysts such as Ziegler-Natta series catalysts and metallocene series catalysts and by well known methods. An addition copolymer of cycloolefin and α-olefin or hydrogenated product thereof which is favorably used in the present invention is preferably manufactured by use of a metallocene series catalyst.

Other Copolymeric Components

The (a2) addition copolymer of cycloolefin and α-olefin favorably used in the composition of the present invention can contain, other than the above (A) an α-olefin component having 2 to 20 carbons and (B) a cycloolefin component represented by the following general formula (V), other copolymerizable unsaturated monomer components as needed, within a scope not conflicting with the objects of the present invention.

Optionally polymerizable unsaturated monomers can include, but are not limited to, for example, hydrocarbon series monomers in which two or more carbon-carbon double bond are included in one molecule, and the like. Concrete examples of hydrocarbon series monomers, in which two or more carbon-carbon double bonds are included in one molecule, can include chain nonconjugated diene such as 1,4-hexadiene, 1,6-octadiene, 2-methyl-1,5-hexadiene, 4-methyl-1,5-hexadiene, 5-methyl-1,5-hexadiene, 6-methyl-1,5-heptadiene, 7-methyl-1,6-octadiene; cyclic nonconjugated diene such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene, 6-chloromethyl-5-isopropenyl-2-norbornene, 4,9,5,8-dimetano -3a,4,4a,5,8,8a,9,9a-octahydro-1H-benzoindene; 2-3-diisopropylidene-5-norbornene; 2-ethylidene-3-isopropylidene -5-norbornene; and 2-propenyl-2,2-norbornadiene. Among them, 1,4-hexadiene, 1,6-octadiene, and cyclic nonconjugated diene, in particular, dicyclopentadiene, 5-ethylidene-2-norbornene, 5-vinyl-2-norbornene, 5-methylene-2-norbornene, 1,4-hexadiene, 1,6-octadiene are preferable.

[Antihazing Agents for Noncrystalline Cycloolefin Resins]

The antihazing agents for noncrystalline cycloolefin resins used in the noncrystalline cycloolefin resin composition of the present invention are antihazing agents for noncrystalline cycloolefin resins having a metal rosinate as a main component.

The content of the antihazing agent for a noncrystalline cycloolefin resin is preferably equal to or more than 0.1 parts by mass and equal to or less than 5 parts by mass, more preferably equal to or more than 0.1 parts by mass and equal to or less than 3 parts by mass, and most preferably equal to or more than 0.3 parts by mass and equal to or less than 2 parts by mass, on the basis of 100 parts by mass of the noncrystalline polyolefin resin composition.

[Other Components]

The noncrystalline cycloolefin resin composition of the present invention can include other thermoplastic resins, thermoplastic elastomer, various compounding agents, and the like, within a range of not impairing the properties of the composition, as needed.

Other Thermoplastic Resins

Other thermoplastic resins can include, for example, in addition to polyphenylene sulfide, polyphenylene ether, polyethersulfone, polysulfone, polycarbonate, polyacetal, and the like, polyester-series polymer such as liquid crystalline polymer, aromatic polyester, polyarylate, polyethylene terephthalate, and polybutylene terephthalate; polyolefin-series polymer such as polyethylene, polypropylene, poly-4-methylpentene-1; polyamide-series polymer such as nylon 6, nylon 66, and aromatic nylon; polymethylmethacrylate, polyacrylonitrilestyrene (AS resin), and polystyrene.

Thermoplastic Elastomer

The thermoplastic elastomer can include, for example, olefin series, styrene series, ester series, amid series, and urethane series thermoplastic elastomers. Among them, olefin series elastomer and styrene series elastomers can be suitably used due to their high compatibility with olefin series resins. Concrete examples of olefin series elastomers can include ethylene-propylene copolymer, ethylene-propylene-diene copolymer, ethylene-butene copolymer, and ethylene-octene copolymer. Concrete examples of styrene series elastomers can include styrene-butadiene-styrene block copolymer, styrene-isopren-styrene block copolymer, and hydrogenated products thereof.

Various Compounding Agents

Various compounding agents are not especially limited as long as they are ordinarily used in thermoplastic resin materials, and can include, for example, compounding agents such as antioxidants, ultraviolet absorbers, light stabilizers, plasticizers, lubricants, antistatic agents, flame retardants, coloring agents such as dyes and pigments, near-infrared ray absorbents, and fluorescent bleaches.

Method for Manufacturing Noncrystalline Cycloolefin Resin Composition

The method for manufacturing the noncrystalline cycloolefin resin composition is not especially limited, and a well known method can be employed. For example, a method of melting and kneading, simultaneously or successively, noncrystalline polyolefin resins, antihazing agents for noncrystalline cycloolefin resins, or in addition, resins and the like, which are blended as needed, can be mentioned. The method of melting and kneading can include, for example, methods for melting and kneading by a single-axis screw extruder or double-axis screw extruder, Banbury mixer, roll, various kneaders and the like, after the resin compositions are dry blended. The temperature for melting and kneading is not especially limited as long as noncrystalline polyolefin resins, antihazing agents for noncrystalline cycloolefin resins, and resins and the like which are blended as needed are melted. However, melting and kneading are generally carried out at temperatures in the range of typically 160° C. -350° C., preferably 180° C.-300° C.

Molded Articles Obtainable from Noncrystalline Cycloolefin Resin Compositions

The molded articles obtainable from noncrystalline cycloolefin resin compositions of the present invention preferably have a light transmittance of 90% or more when measured at a wavelength of 500-750 nm with a 2 mm light path length. More preferably, the articles have a light transmittance of 80% or more when measured at a wavelength of 400-750 nm with a 2 mm light path length.

The noncrystalline cycloolefin resin composition according to the present invention can maintain high transparency while having various properties derived from cycloolefin resins. Therefore, the composition can be favorably used for optical materials. Also, the molded article can be favorably used as optical elements such as lenses, light guide plates, and diffraction gratings, in which maintaining the transparency thereof is necessary.

EXAMPLES

The present invention is described in detail below in conjunction with examples and comparative examples.

Measurement and Evaluation Method

The measurement and evaluation methods of various properties in present examples and comparative examples will be described below.

[Haze Value]

The haze values were measured using a haze meter (manufactured by TOYO SEIKI Co., Ltd., trade name: HAZE-GUARD II) in conformity with JIS K7136.

[Haze Value Increase]

The measurements of haze values on a molded article having a thickness of 2 mm were carried out for two cases. The first case was just after molding and the other case was when the article was exposed to an environment having a temperature of 70° C. and humidity of 95% for 16 hours, followed by cooling it in an environment having a temperature of 23° C. and humidity of 50% for 1.5 hours. The difference in the haze values between after the article was exposed to environmental change and just after the article was molded was calculated as the haze value increase. When the haze value increase is equal to or more than 1, the light transmittance decreases when the molded article is used as an optical element, and the performance is likely to be impaired. Consequently, it is desirable that the haze value increase is less than 1.

[Light Transmittance]

Light transmittances at a wavelength of 500 nm and 400 nm were measured by use of a spectral photometer (manufactured by JASCO, trade name: V-570).

Example 1

Resins having the following structure (manufactured by TOPAS Advanced Polymer, trade name: TOPAS (registered trade name) 6013) were used as cycloolefin resins. A material obtained by adding 1 part by mass of rosinate partial calcium salt (manufactured by Arakawa Chemical Industries, trade name: KR-50M, equivalent amount of calcium/equivalent amount of carboxyl group is 47.5%) to 100 parts by mass of cycloolefin resins, and a material without addition (free of additives) were each melted and kneaded at a cylinder temperature of 250° C. by use of a double-axis extruder (manufactured by The Japan Steel Works, Ltd., trade name: TEX 30), and pelletization was carried out. Subsequently, by use of the resultant pellets, flat plates of 70 mm×70 mm×2 mm were molded at a cylinder temperature of 280° C. and a mold temperature of 120° C. using an injection mold (manufactured by Sumitomo Heavy Industries, Ltd., trade name: SE75D), to thereby obtain test specimens.

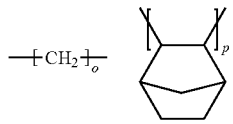

[wherein o and p are repeating units.]

Measurement of the haze value after molding was carried out for the obtained test specimens. Subsequently, the test specimens were exposed to an environment with a temperature of 70° C. and humidity of 95%, followed by cooling in an environment with a temperature of 23° C. and humidity of 50%. Then the haze value was measured and at the same time the light transmittance was measured and evaluated. Meanwhile, for the purpose of clarifying the effect resulting from rosinate partial calcium salt addition, the difference between the haze value for the case where rosinate partial calcium salt was added and the haze value of the case where rosinate partial calcium salt was not added was calculated. The calculated difference was designated as "improvement degree". The results are shown in Table 1.

TABLE 1

| | Haze value increase | | Improvement degree (Free of additives − Additives) | Light transmittance (Additives, after environmental test) | |
|---|---|---|---|---|---|
| | Free of additives | Additives | | 500 nm | 400 nm |
| Example 1 | 0.40 | 0.10 | 0.30 | 90.0 | 83.8 |
| Example 2 | 0.40 | 0.17 | 0.23 | 89.7 | 86.2 |
| Example 3 | 0.40 | 0.12 | 0.28 | 89.2 | 83.5 |
| Example 4 | 0.40 | 0.07 | 0.33 | 89.6 | 85.8 |
| Example 5 | 0.40 | 0.08 | 0.32 | 89.1 | 82.9 |
| Example 6 | 0.40 | 0.06 | 0.34 | 88.4 | 80.4 |
| Example 7 | 0.40 | 0.30 | 0.10 | 88.6 | 83.5 |
| Example 8 | 0.13 | 0.03 | 0.10 | 90.8 | 85.8 |
| Comparative Example 1 | 0.40 | 0.42 | −0.02 | 90.8 | 88.2 |
| Comparative Example 2 | 0.40 | 0.41 | −0.01 | 90.6 | 86.7 |
| Comparative Example 3 | 0.40 | 0.21 | 0.19 | 66.1 | 59.7 |
| Comparative Example 4 | 0.13 | 0.14 | −0.01 | 91.6 | 90.2 |

Example 2

Test specimens were obtained in a similar manner as Example 1, expect that 0.5 parts by mass of rosinate partial calcium salt was added, and measurement and evaluation were carried out in a similar manner as Example 1. The results are shown in Table 1.

Example 3

Test specimens were obtained in a similar manner as Example 1, expect that 1 part by mass of rosinate partial calcium salt (manufactured by Arakawa Chemical Industries, equivalent amount of calcium/equivalent amount of carboxyl group is 19%) was added, and measurement and evaluation were carried out in a similar manner as Example 1. The results are shown in Table 1.

Example 4

Test specimens were obtained in a similar manner as Example 1, expect that 1 part by mass of rosinate partial magnesium salt (manufactured by Arakawa Chemical Industries, trade name: KM-1600, equivalent amount of magnesium/equivalent amount of carboxyl group is about 20%) was added, and measurement and evaluation were carried out in a similar manner as Example 1. The results are shown in Table 1.

Example 5

Test specimens were obtained in a similar manner as Example 1, expect that 1 part by mass of rosinate partial sodium salt (manufactured by Arakawa Chemical Industries, equivalent amount of sodium/equivalent amount of carboxyl group is about 19%) was added, and measurement and evaluation were carried out in a similar manner as Example 1. The results are shown in Table 1.

Example 6

Test specimens were obtained in a similar manner as Example 1, expect that 1 part by mass of rosinate partial potassium salt (manufactured by Arakawa Chemical Industries, equivalent amount of potassium/equivalent amount of carboxyl group is 19%) was added, and measurement and evaluation were carried out in a similar manner as Example 1. The results are shown in Table 1.

Example 7

Test specimens were obtained in a similar manner as Example 1, expect that 1 part by mass of rosinate partial zinc salt (manufactured by Arakawa Chemical Industries, equivalent amount of zinc/equivalent amount of carboxyl group is 14.25%) was added, and measurement and evaluation were carried out in a similar manner as Example 1. The results are shown in Table 1.

Example 8

Test specimens were obtained in a similar manner as Example 1, expect that resins having the following structure (manufactured by ZEON Corp., trade name: ZEONEX (registered trademark) 330R) was used as a cycloolefin resin, and measurement and evaluation were carried out in a similar manner as Example 1. The results are shown in Table 1.

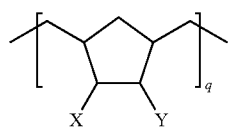

[Wherein q is a repeating unit, X, Y are each independently a hydrocarbon radical containing 1 to 10 carbons.]

Comparative Example 1

Test specimens were obtained in a similar manner as Example 1, expect that 1 part by mass of rosinate (manufactured by Arakawa Chemical Industries, trade name: KR-85) was added, and measurement and evaluation were carried out in a similar manner as Example 1. The results are shown in Table 1.

Comparative Example 2

Test specimens were obtained in a similar manner as Example 1, expect that 0.5 part by mass of rosinate partial calcium salt, KR-50M was added, and measurement and evaluation were carried out in a similar manner as Example 1. The results are shown in Table 1.

Comparative Example 3

Test specimens were obtained in a similar manner as Example 1, expect that 5.5 part by mass of rosinate partial calcium salt, KR-50M was added, and measurement and evaluation were carried out in a similar manner as in Example 1. The results are shown in Table 1.

Comparative Example 4

Test specimens were obtained in a similar manner as Comparative Example 1, expect that 330R was used as a cycloolefin resin, and measurement and evaluation were carried out in a similar manner as Example 1. The results are shown in Table 1.

As shown in Table 1, due to the addition of the antihazing agents for noncrystalline cycloolefin resins according to the present invention, the haze increases due to environmental changes were small, and also, reduction of light transmittance due to hazing was not seen in any of Examples 1-8. Compared with this, the effect to suppress haze increases by the addition of rosinates could not be seen in Comparative Examples 1 and 4 in which rosinates were added. In addition, in Comparative Example 2, the added amount of the antihazing agents for noncrystalline cycloolefin resins according to the present invention was small, and the effect of suppressing haze increase was not sufficient. On the other hand, in Comparative Example 3, because the added amount of the antihazing agents for noncrystalline cycloolefin resins according to the present invention was large, the antihazing agent did not melt into the resin, and as a result, phase separation occurred and the resin composition showed haze. As a result, the light transmittance was low.

INDUSTRIAL APPLICABILITY

Molded articles made of noncrystalline cycloolefin resin compositions which include the antihazing agents for noncrystalline cycloolefin resins according to the present invention can prevent hazing due to environmental changes while maintaining various properties possessed by the noncrystalline cycloolefin resins. As a result, the transparency of the molded article can be maintained. Owing to these properties, the noncrystalline cycloolefin resin compositions of the present invention can be favorably used for, for example, optical applications, medical applications, packaging applications, electric and electronic elements applications and industrial component applications. Among others, the noncrystalline cycloolefin resin compositions of the present invention can be favorably used as materials for optical applications, in which maintaining the transparency is an essential requirement, for example, optical lenses such as f-θ lenses, image pickup system lenses, and light pickup lenses, light guide plates, and diffraction gratings.

The invention claimed is:

1. A cycloolefin transparent resin composition comprising:
a metal salt rosinate; and
a noncrystalline polyolefin resin including a cycloolefin component as a copolymer component;
wherein the noncrystalline polyolefin is included as a main component;
wherein the metal salt rosinate is a metal salt of one or more members selected from the group consisting of compounds represented by general formulae (I), (II), (III), and (IV);

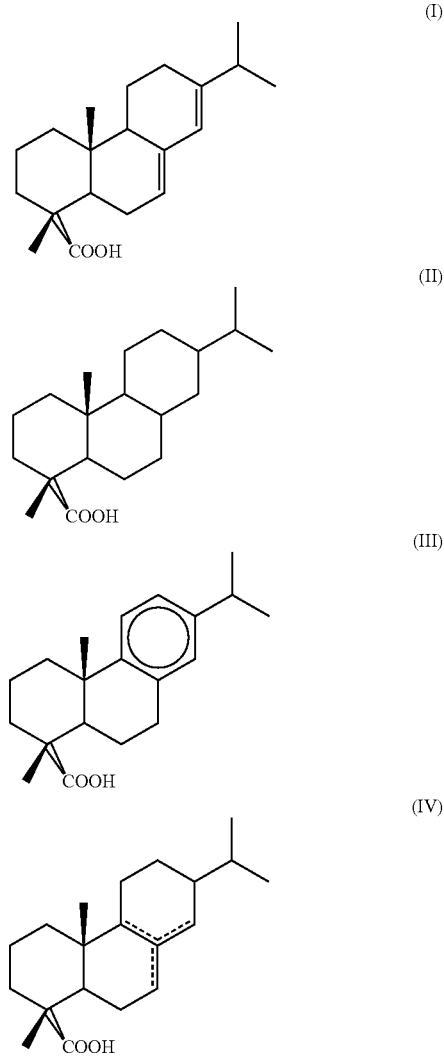

wherein the metal salt rosinate is present in a content equal to or more than 0.1 parts by mass and equal to or less than 5 parts by mass on a basis of 100 parts by mass of the noncrystalline polyolefin resin;
wherein the metal salt comprises one or more members selected from the group consisting of an alkali metal salt, an alkaline earth metal salt, a Group 12 metal salt, and combinations thereof;
wherein the composition displays prevention of clouding generated by exposure to high temperature and high humidity atmosphere.

2. The cycloolefin transparent resin composition according to claim 1, wherein the alkali metal salt comprises at least one of a sodium salt or a potassium salt.

3. The cycloolefin transparent resin composition according to claim 1, wherein the alkaline earth metal salt comprises at least one of a calcium salt or a magnesium salt.

4. The cycloolefin transparent resin composition according to claim 1, wherein the Group 12 metal salt comprises a zinc salt.

5. The cycloolefin transparent resin composition according to claim 1, wherein the noncrystalline polyolefin resin is a copolymer including:

(A) an α-olefin component having 2 to 20 carbons; and
(B) a cycloolefin component represented by general formula (V)

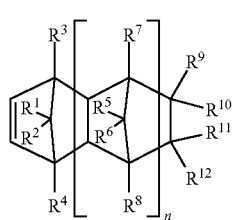

(V)

wherein $R^1$-$R^{12}$ may independently be the same or different, and are each selected from the group consisting of hydrogen atom, halogen atom, and hydrocarbon radical, $R^9$ and $R^{10}$, $R^{11}$ and $R^{12}$ may be combined to form a divalent hydrocarbon radical, $R^9$ and $R^{10}$, $R^{11}$ and $R^{12}$ may form a ring by joining each other;

n represents 0 or a positive integer, and when n is two, or more, $R^5$-$R^8$ may be the same or different, independently, for each repeating unit.

6. The cycloolefin transparent resin composition according to claim 1, wherein the composition forms a molded article and has a light transmittance measured at a wavelength of 500-750 nm with a 2 mm light path length of 90% or more.

7. The cycloolefin transparent resin composition according to claim 1, wherein the composition forms a molded article and has a light transmittance measured at a wavelength of 400-750 nm with a 2mm light path length of 80% or more.

8. An optical material comprising the cycloolefin transparent resin composition according to claim 1.

9. An optical element obtained by molding the cycloolefin transparent resin composition according to claim 1.

10. An optical element according to claim 9, wherein the optical elements are any one of a lens, a light guide plate, or a diffraction grating.

11. A method comprising:

contacting a resin composition with an antihazing agent to form a noncrystalline resin mixture, the resin composition including: a noncrystalline cycloolefin resin which includes a cyclic olefin component as a copolymer component; the antihazing agent including a metal salt rosinate;

forming the noncrystalline resin mixture into a molded article, wherein transparency of the molded article is maintained;

wherein the metal salt rosinate is a metal salt of one or more members selected from the group consisting of compounds represented by general formulae (I), (II), (Ill), and (IV);

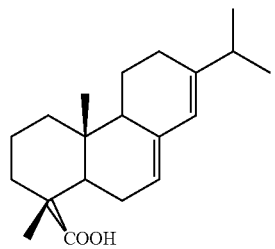

(I)

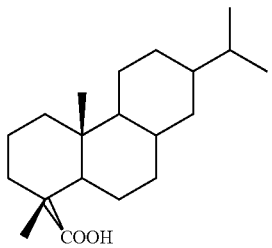

(II)

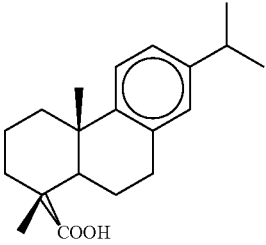

(III)

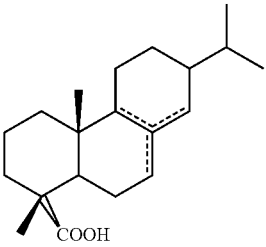

(IV)

wherein the metal salt rosinate is present in a content equal to or more than 0.1 parts by mass and equal to or less than 5 parts by mass on a basis of 100 parts by mass of the noncrystalline cycloolefin resin;

wherein the metal salt comprises one or more members selected from the group consisting of an alkali metal salt, an alkaline earth metal salt, a Group 12 metal salt, and combinations thereof;

wherein the noncrystalline resin mixture displays prevention of clouding generated by exposure to high temperature and high humidity atmosphere.

12. The method according to claim 11, wherein the alkali metal salt includes at least one of a sodium salt or a potassium salt, the alkaline earth metal salt includes at least one of a calcium salt or a magnesium salt, wherein the Group 12 metal salt includes a zinc salt.

13. The method according to claim 11, wherein the noncrystalline cycloolefin resin is a copolymer including:

(A) an α-olefin component having 2 to 20 carbons; and
(B) a cycloolefin component represented by general formula (V)

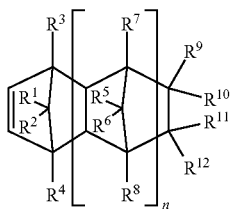 (V)

wherein $R^1$-$R^{12}$ may independently be the same or different, and are each selected from the group consisting of hydrogen atom, halogen atom, and hydrocarbon radical, $R^9$ and $R^{10}$, $R^{11}$ and $R^{12}$ may be combined to form a divalent hydrocarbon radical, $R^9$ and $R^{10}$, $R^{11}$ and $R^{12}$ may form a ring by joining each other;

n represents 0 or a positive integer, and when n is two or more, $R^5$-$R^8$ may be the same or different, independently, for each repeating unit.

14. The method according to claim 11, wherein the molded article is selected from the group consisting of lenses, light guide paths, and diffraction gratings, having a light transmittance measured at a wavelength of 400-750 nm with a 2mm light path length of 80% or more.

* * * * *